(12) United States Patent
Kubo et al.

(10) Patent No.: US 6,544,119 B2
(45) Date of Patent: Apr. 8, 2003

(54) METHOD, VIDEO GAME DEVICE, AND PROGRAM FOR CONTROLLING GAME

(75) Inventors: Morikuni Kubo, Tokyo (JP); Atsushi Suzuki, Tokyo (JP); Masanori Takabayashi, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/895,167

(22) Filed: Jul. 2, 2001

(65) Prior Publication Data

US 2002/0006819 A1 Jan. 17, 2002

(30) Foreign Application Priority Data

Jul. 4, 2000 (JP) ........................................ 2000-202134

(51) Int. Cl.⁷ .............................................. A63E 13/00
(52) U.S. Cl. ............................................ 463/11; 463/9
(58) Field of Search ............................ 463/4, 9, 11, 36, 463/44, 45

(56) References Cited

U.S. PATENT DOCUMENTS 5,662,332 A 9/1997 Garfield

FOREIGN PATENT DOCUMENTS

| JP | 2000-157744 | 3/2000 |
|---|---|---|
| JP | 2000-157744 | 6/2000 |
| JP | 2001-29656 | 2/2001 |
| JP | 20001-29657 | 2/2001 |

OTHER PUBLICATIONS

"Monthly Coin Journal, Jun. 2000", vol. 25, No. 6, Total vol. No. 294; published by A–Create, May 30, 2000; pp. 276, "Renda Fighter (= Consecutive–Hit Fighter)".

Primary Examiner—Denise L. Esquivel
Assistant Examiner—Melvin Jones
(74) Attorney, Agent, or Firm—Sughrue Mion, PLLC

(57) ABSTRACT

A game control method of the invention provides an effective card in a card game, according to a speed of player's card drawing operation. Firstly, the operation is detected and a speed of the operation is calculated. Then, the speed is compared with a predetermined speed such as a previous average speed to determine the difference. On the other hand, an appearance card table defines types of cards to be provided for each game situation and the difference. The method determines a card to be supplied to the player in response to the operation, by referring to the table according to the game situation and the difference.

12 Claims, 5 Drawing Sheets

| SITUATION | CURRENT SPEED ≥ 2 x AVERAGE SPEED | 2 x AVERAGE SPEED > CURRENT SPEED ≥ 1.5 x AVERAGE SPEED | 1.5 x AVERAGE SPEED > CURRENT SPEED ≥ AVERAGE SPEED | | |
|---|---|---|---|---|---|
| A001 (CAN NOT MOVE DUE TO A GREAT NUMBER OF TRAPS) | A100 (REMOVING TRAP: ALL THE TRAPS ARE DESTROYED) | A200 (GREAT STORM: ALL THE SPELL CARDS ARE DESTROYED) | | | |
| B001 (CAN NOT COMPETE BECAUSE OF EXISTENCE OF ACE HAVING A HIGH AP) | B100 (MIRROR WALL OF A SCREEN: REDUCE AN AP OF A MONSTER OF AN ENEMY TO A HALF IN RESPONSE TO AN OFFENSE OPERATION) | B200 (SEAL A TIME: ETERNALLY SPELLBIND A MONSTER HAVING THE LARGEST AP IN A PLAYING FIELD) | B300 (A CHANGE OF MIND: ROB OF A MONSTER HAVING THE LARGEST AP AMONG MONSTERS OF AN ENEMY) | | |
| B003 (OVERWHELMED BY A LARGE NUMBER OF MONSTERS) | C100 (HOLY BARRIER MIRROR FORCE: DESTROYS MONSTERS COMPLETELY IN RESPONSE TO AN OFFENSE OPERATION OF AN ENEMY) | | | | |
| ⋮ | | | | | |
| ⋮ | | | | | |

FIG. 6

METHOD, VIDEO GAME DEVICE, AND PROGRAM FOR CONTROLLING GAME

BACKGROUND OF THE INVENTION

1. Field of the Invention

The invention relates to a method, a video game device, and a program all of which are for controlling a game, and in particular, to a method, a video game device, and a program, all of which are for changing images displayed in a game according to a manipulation speed of button of a game controller.

2. Description of the Related Art

Various types of card games can be available. In one of these types of card games, each player has, in an individual deck, a plurality of card each of which corresponds to different attributes and different abilities, and puts one or more cards from the deck onto a playing field. Each player is also given a life point (hereinafter, shortened as "LP"), and the LP is reduced or incremented based on the difference between the cards provided on the playing field. When the LP is reduced to zero, a game player of the LP loses the game.

Such the card game is disclosed, for example, in U.S. Pat. No. 5,662,332.

On the other hand, the applicant proposes a card game which is capable of playing in a portable video game device in Japanese Laid Open Publication No. 2000-157744. In the proposed card game, a player firstly selects one or more cards and puts the cards to be predetermined area on a display of the portable video game device. The cards are selected among a plurality of cards which vary in type and each of which has an ability index and a function different from each other.

Then, the cards are compared with cards provided by an opponent (for example, a computer in the portable video game device) and wins or losses are decided based on the difference between the cards of one player and the cards of the other player (opponent). Also, in this game, until either LP of the players becomes to zero, the game is continued.

In addition, another similar card game for playing in a household video game device is also proposed and disclosed in Japanese Laid Open Publication No. 20001-29657. In a card game such as the above proposed game played in the household video game device, the number of the cards can be drastically increased and a variation of functions of the cards can be enhanced, compared with the card game for the portable video game device.

In all of the aforementioned card games, game images are displayed in a game display area on a LCD display device. In addition, a player's hand area where a player can place his/her own five cards thereon as hand cards is displayed in a lower part of the game display area. On the other hand, an opponent's hand area where an opponent can place five cards thereon as hand card is displayed in a upper part of the game display area. Furthermore, in a middle part of the game display area other than the player's hand area and the opponent's hand area, a table or an arena where a game is played is displayed as a playing field.

When the number of cards in the hand area becomes less than five by putting some of the cards to the playing field, the player (or the opponent) draws cards from a deck and places the cards to the playing field, the player (or the opponent) draws cards from the deck and places the cards on the hand area. In this case, the cards which the player or the opponent draws are selected from his/her own deck randomly. An ability of each of thus selected cards influences confrontation between the player and the opponent in the game.

Cards which are used in one of the above proposed card game includes "monster cards", "magic cards", and "landform cards". Each of the monster cards has predetermined ability of offence and defense. Each of the magic cards effects on monster cards on the playing field, when the magic card is moved to a predetermined position in the playing field from the hand area. Each of the landform cards determines a landform for battle of the playing field and revises the ability of offence and defense of the monster card in the landform.

The above-mentioned monster cards, and landform cards are effective when the cards are places on the playing field, thereby victory or defeat is determined through a battle.

Users can play card game in a similar manner to a real card game by using the above-mentioned portable video game device or the household video game device.

In the real card game, that is, a game which uses "real cards" printed, a player often strains to draw an excellent card from a deck or prays for a good card when a battle situation fails into a critical phase. A card which is obtained by the special action is not always superior to a card obtained by a normal and a calm action. However, the emotional elevation of the player gives a feeling of real playing and a tense feeling to the game, and the player is more excited.

However, in a card using the portable video game device or the household video game device, to draw a card from a deck, a player pushes a button of a game controller connected to a video game device (body) instead of drawing a card by a hand. A game program which is loaded into the video game device randomly selects a card from the deck and places the card on a hand area when the button is pushed.

Therefore, when a card game is executed by the use of the above-mentioned video game devices, a player can not realize special actions, such as straining to draw an excellent card and praying for a good card. In consequence, the card game may be calmly progresses without excitement. If the game is progressed as above, the game lacks a feeling of real playing and a tense feeling and a player of the game feels the game is not interesting.

SUMMARY OF THE INVENTION

It is therefore an object of the invention to provide a video game control method and a video game device, both of which can control to change a card which is drawn by a player, in consideration of excitement of the player.

It is another object of this invention to provide a method and a device of the type described, which can introduce a degree of excitement into the video game in the form of a manipulation speed of a button of a game controller connected to the video game device.

It is yet another object of the invention to provide a video game control method and a video game device which can determine a card which is drawn according to a comparison between the pushing speed of the button of the game controller and an averaged pushing speed which is calculated by averaging out previous pushing speeds of the button of the game controller.

It is still another object of the invention to provide a video game control method and a video game device which can determine a card which is drawn according to a comparison between the pushing speed of the button of the game controller and a predetermined speed.

It is another object of the invention to provide a video game control method and a video game device which can determine a card which is drawn according to a comparison between the pushing speed of the button of the game controller and a predetermined speed.

It is another object of the invention to provide a vide game control method and a video game device which can control so that a card determined according to the pushing speed of the button of the game controller is a new card which does not exist in a deck.

Therefore, a video game control method and a video game device of the invention detect player's manipulation of analog buttons of a game controller and compute a speed of the manipulation (pushing) of the buttons to control drawing card according to the computation result.

According to a first aspect of the invention, there is provided a method of controlling a game, in a computer, by using a plurality of sorts of elements. The method comprises the steps of detecting a player's inputting operation, determining the sort of element in response to the player's operation, and displaying the determined sort of element on a monitor. And wherein, when a situation of the game becomes a predetermined situation, the determining step determines the sort of element based on the difference between a speed of the player's operation and a predetermined speed.

According to a second aspect of the invention, there is provided a video game device performing a game using a plurality of sorts of elements. The device comprises a detecting unit which detects a player's inputting operation, a storage device which stores a predetermined speed, a determining unit which detects the sort of element in response to the player's operation, and a displaying unit which displays the determined sort of element on a monitor. And wherein, when a situation of the game becomes a predetermined situation, the determining unit determines the sort of element based on the difference between a speed of the player's operation and the predetermined speed.

According to a third aspect of the invention, there is provided a program product comprising, computer readable instructions and a recording medium bearing the computer readable instructions; the instructions being adaptable to enable a computer to perform a method of controlling a game, in a computer, using a plurality of sorts of elements. The method comprises the steps of detecting a player's inputting operation, determining the sort of element in response to the player's operation, and displaying the determined sort of element on a monitor. And wherein, when a situation of the game becomes a predetermined situation, the determining step determines the sort of element based on the difference between a speed of the player's operation and a predetermined speed.

BRIEF DESCRIPTION OF THE DRAWINGS

FIG. 6 shows an example of contents of an appearance card table according to an embodiment of the invention.

DESCRIPTION OF THE PREFERRED EMBODIMENT

Figure 1:
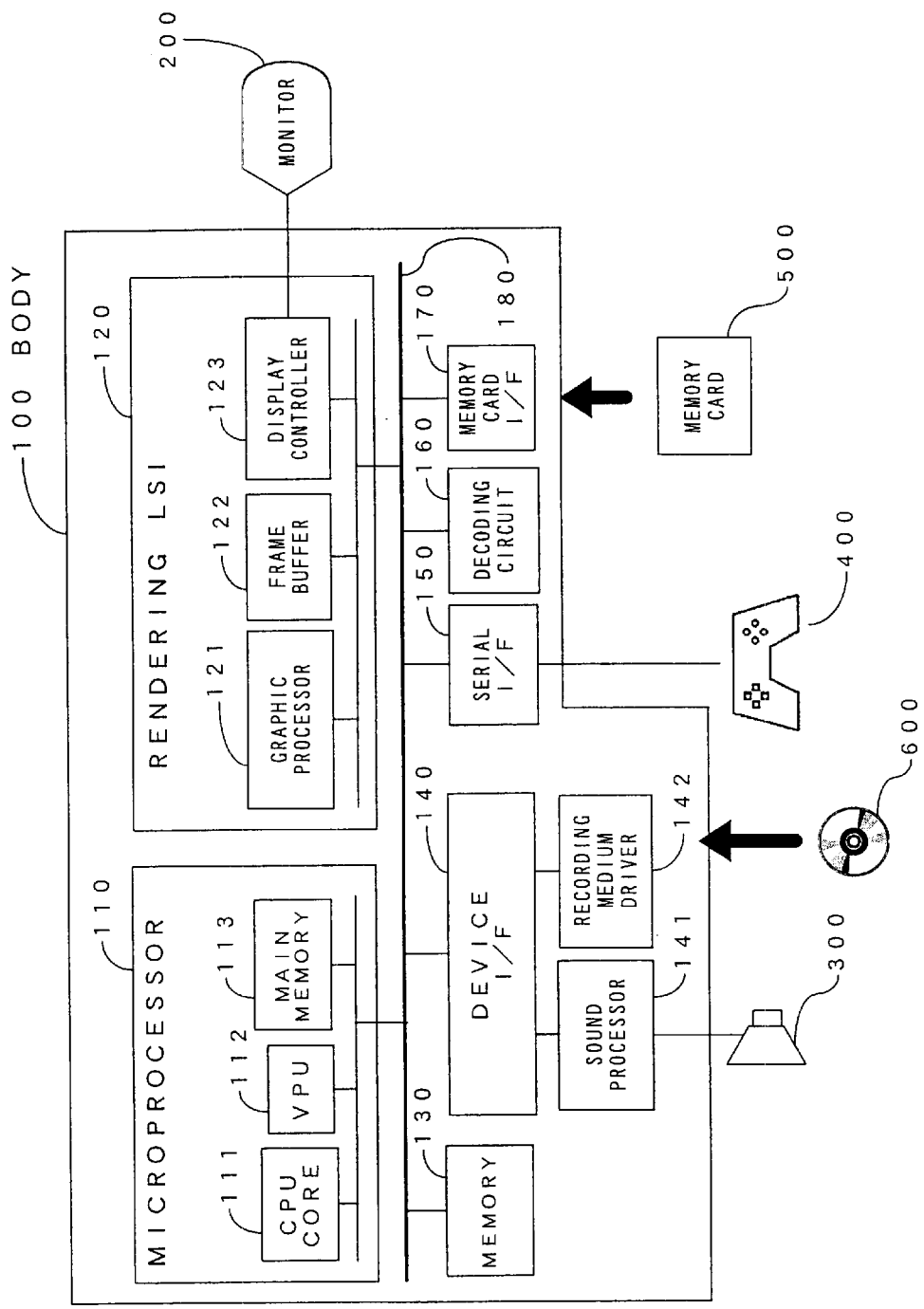
FIG. 1 shows a block diagram of a video game device according to an embodiment of the invention.

Referring to FIG. 1, description is at first made about a video game device of an embodiment of the invention. The video game device shown in FIG. 1 merely exemplified and may be changed to any other game devices or machines.

The video game device shown in FIG. 1 includes a body 100, a television monitor 200 (hereinafter, simply referred to as a "monitor"), a speaker 300, a controller 400, a memory card 500, and a recording medium 600. The elements 200 through 400 are connected to the body 100. The game device is suited for home use.

The body 100 further includes a microprocessor 110 which controls operations of the other elements, a rendering LSI 120 which mainly generates game images, other elements 130–170, and a bus 180 connects these elements.

The microprocessor 110 further includes a CPU core 111, a VPU 112, and a main memory 113, and an internal bus connects the elements to one another. The CPU core 111 is configured, for example, to have two 64-bits ALUs and FPU. The VPU 112 is a vector operation unit for calculating floating-point data. For example, the VPU 112 may be configured to have a VPU0 and VPU1.

The rendering LSI 120 includes a graphic processor 121, a frame buffer 122, and a display controller 123, and the elements are connected to an internal bus. Also, to the display controller 123, the monitor 200 is connected. Graphic processor 121 is a microprocessor which is different from the microprocessor 110 and is dedicated to perform graphic processing. The processor 121 executes calculation for coordinate transformation, a light source, rendering operation, and texture mapping to display a pseudo three-dimensional image including polygon images. The frame buffer 122 includes a display area and a non-display area. The display area is an area for storing images corresponding to a display area on the monitor 200.

In this case, it is general that the monitor of a home television is used as the monitor 200. Also, when the method and the video game device of the invention are used in a personal computer or a workstation, a CRT display connected to the personal computer or the workstation may be used as the monitor 200.

A memory 130 is, in particular, used for i/o processing of the recording medium 600 (for example, DVD-ROM or CD-ROM). The memory 130 is generally composed of DRAM (Dynamic RAM).

A device interface 140 controls audio data or input/output data and is connected to a sound processor 141 and a recording medium driver 142. The sound processor 141 controls to output an effective sound of a game from the speaker 300 at a predetermined timing. That is, music or other effective sound is provided from the speaker 300 by reproducing ADPCM data supplied from the recording medium 600 or voice data stored in a sound buffer (not shown).

In this case, a speaker incorporated in a home television is generally used as the speaker 300. Also, when the method and the video game device of the invention are used in a personal computer or a workstation, a speaker connected to the personal computer or the workstation or a built-in speaker may be used as the speaker 300.

The recording medium drive 142 reads data stored in the recording medium 600, and transfers the data to the memory 130 or the main memory 113. In the recording medium 600, a program or image data is stored which is required to perform a game. The contents of the program are read by the recording medium drive 142, and are loaded into the main memory 113 in the microprocessor 110. The recording medium is a portable recording medium such as a DVD-ROM, a CD-ROM, or a floppy disk.

Figure 2:
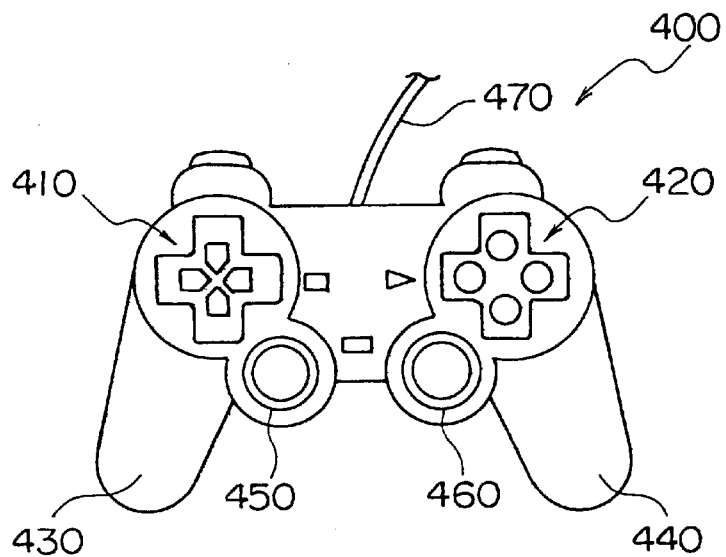
FIG. 2 shows a front elevation of a controller of a video game device according to an embodiment of the invention.

To a serial interface 150, the controller 400 is connected. A player of a game instructs a game character to perform various actions by using the controller 400. Signals form the controller 400 are transferred to the CPU core 111 via the interface 150. In response to the player's instructions, the CPU core 111 control the rendering LSI 120 to display images reflecting the players instructions on the monitor 200 according to instructions of the game program in the main memory 113, The controller 400 includes a plurality of buttons each of which is assigned to a specific function, for example, to start a game, select an item, and move a game character vertically or horizontally. Also, when the method and the video game device of the invention are used in a personal computer or a workstation, a keyboard or joystick connected to the personal computer or the workstation may be used as the controller 400. Since the method and the video game device of the invention are closely related to a structure of the controller 400, detail description about the structure will be made later with reference to FIG. 2.

A decoding circuit 160 decodes image data, including still or animated image data, which are read out from the recording medium 600 and are stored in the memory 113 and stores the decoded data in the main memory 113 again.

Specifically, the decoding circuit 160 is capable of carrying out high-speed execution of inverse discrete cosine transform (inverse (DCT) operations, and it is also capable of expanding compressed data read out from the recording medium 150 in accordance with still color image compression standards (known as JPEG) or cumulative media moving image encoding standards (known as MPEG).

When the memory card 500 is inserted into a memory card interface 170, the memory card interface 170 reads the contents of the memory card 500, and loads the contents into the main memory 113 based on a judgement of the CPU core 111.

The bus 180 serves as a general purpose data transmission path between the elements connected to the bus 180.

The memory card 500 stores various parameters of, for example, keeping states of the game when the game is suspended. Herein, a card type memory such as the memory card 150 is used, but a type of memory is not limited to the card type memory. The memory card interface 170 prepares two memory card slots so as to insert two memory cards simultaneously and read data from them. For example, two memory cards are used in a game providing a fight between two players and each of the two memory cards stores data about one of the players.

In addition, the video game device may includes a USB interface or an IEEE 1394 interface (not shown), and data can be transmitted between the device and an outside device via these interfaces.

Also, in the case where the method according to the invention is applied to the arcade game device, the body 100, the monitor 200, the speaker 300, and the controller 400 shown in FIG. 1 may be all incorporated into a single body. Next, description is made about the structure of the controller shown in FIG. 1 with reference to FIG. 2.

The controller 400 includes a first operation unit 410, a second operation unit 420, a first handle 430, a second handle 440, a third operation unit 450, a fourth operation unit 460, and a connection code 470. The controller 400 further includes a start switch to start a game and a select operation modes of the third operation unit 450 and the fourth operation unit 460 between the third operation unit 450 and the fourth operation unit 460. Also, the controller 400 includes a display unit which displays the operation modes of the operation units. The controller 400 includes some other buttons, but descriptions about the buttons are omitted since the buttons are not concerned with the invention.

When a player plays a game, the player wraps the first handle 430 with the palm of the player's left hand, and wraps the second handle 440 with the palm of the right hand. And then, operation units 410, 420, 450, 460, and the other buttons are manipulated by fingers of the left and the right hands of the player.

Also, the controller 400 is connected to the serial interface 150 of the body 100 through the connection code 470. Operations of the player using the buttons are transmitted to the serial interface 150 through the connection code 470, and interpreted by the microprocessor 110. On the contrary, instructions are sent from the microprocessor 110 to the controller 400 via the serial interface 150 and the connection code 470.

The first operation unit 410 has four buttons and the buttons are used to, for example, designate positions of drawn cards on a hand area in a card game. In response to operation (pushing) of the buttons arranged in the first operation unit 410 vertically and horizontally, a highlighted frame displayed on one of positions where a drawn card is placed and is moved to the next position vertically and horizontally.

The second operation unit 420 has four buttons arranged in a similar manner to the first operation unit 410. Each of the buttons is assigned to a specific function of the game. In the card game of the invention, when one of the buttons is pushed, a card is drawn from a deck.

Next, for the sake of easy understanding of the invention, description is made about a card game which is played on a video game device according to the invention. Detail description of the card game is disclosed in Japanese Laid Open Publication No. 2001-29656.

In the card game, players puts (in other words, summons) a card to a playing field in a board which is displayed on the monitor 200, by turns. In this example, the controller 400 is connected to the body 100 and a player plays the card game to battle against a computer.

Hereinafter, to simplify the explanation, a card which is drawn from a deck and is not put on a playing field, is referred to as a "hand card". On the other hand, a card which is drawn from a deck and is placed on a playing field, is referred to as a "field card".

Cards used in the card game consists of 672 types of monster cards and 160 types of the other cards, therefore, 832 types of cards are used in the game. At first, the limited number of cards are selected among these 832 types of cards. For example, 41 cards are selected and players continue to place one of the selected cards on the playing filed with designation of offence or defense by turn, until a life point of one of the players becomes zero.

Specifically, cards collected by each player are stored in an area (which is called a baggage) in the main memory 113 for each player. Then, 40 cards are selected from the cards in the baggage to construct a deck. Further, cards are drawn from the deck one by one so that the hand cards are configured to include five cards. Each of the players alternately places one of the cards placed on the hand area, on the playing field.

Therefore, in the card game, the players are required to perform process related to the hand cards and perform process related to the field cards.

Next, detail description is made about cards used in the card game. As described above, the cards are roughly classified into monster cards, magic cards, and landform cards.

Each of the monster cards has an offence ability (denoted by offense ability index AP) and a defense ability (denoted by defense ability index DP) according to a monster illustrated on the card. Also, the card has one of six offense attributes, light, darkness, water, fire, land, and the wind. In this embodiment, a first card having an offense attribute of land is superior to a second card having an offense attribute of the wind.

On the other hand, the magic cards bring a predetermined influence to a card which is placed on the playing field. The magic cards are further classified into pure magic cards, strengthening cards, and trap cards. The trap cards further includes whole area trap cards which provide an effect over whole area of the playing field and limited area trap cards which provide an effect over a limited area of the playing field. Also, the magic cards include ceremony cards which generate a new card by discarding the predetermined number of monster cards.

When the pure magic card is placed on the playing field with the face up, the cards immediately provides an effect of the card and disappears. In contrast, when the pure magic card is placed on the playing field with the reverse side up, the card stays on the playing field with no effect and a player can turn the card the face up at a desirable turn, to bring about an effect on the card.

The pure magic cards can be classified, according to an effect, into direct offense cards, card offense cards, seal cards, restoring cards, and opponent, and the card offense cards weaken or sweep opponent's cards placed on the plying field. Also, the seal cards can prevent an opponent from performing a turn operation of a card taking an offensive posture or a defensive posture. The restoring cards can restore an LP and the displaying cards can turn a card the face up which is placed the reverse side up.

When the strengthening card is put on a monster card the face up, ability of the monster card is increased. When strengthening the ability is successful or failed, the strengthening card disappears from a monitor. The strengthening card and the monster card can be put on a hand area simultaneously. This operation is called a "combo putting" operation or may be simply called combo putting.

Furthermore, the trap card brings about any effect automatically when an opponent's offense satisfies a predetermined condition. When the trap card gives its effect as above, the card turns the face up. In this embodiment, the whole area trap cards and the limited area trap cards are included in the trap cards, as described above.

Next, the landform cards which express landforms are classified into forest cards, wasteland card, mountain card, prairie card, sea cards, darkness cards, and light (or fighting place) cards. Depending upon these landform cards, as described above.

Next, the landform cards which express landforms are classified into forest cards, wasteland card, mountain card, prairie card, sea cards, darkness cards, and light (or fighting place) cards. Depending upon these landform cards, the offense ability index AP and the defense ability index (DP) of the monster cards are revised. In the card game, the landform cards further include virus landform cards which generate a virus polluted zone, labyrinth wall cards which deny invading a specific monster, and cartoon cards which strengthen only comical creature cards.

Figure 3:
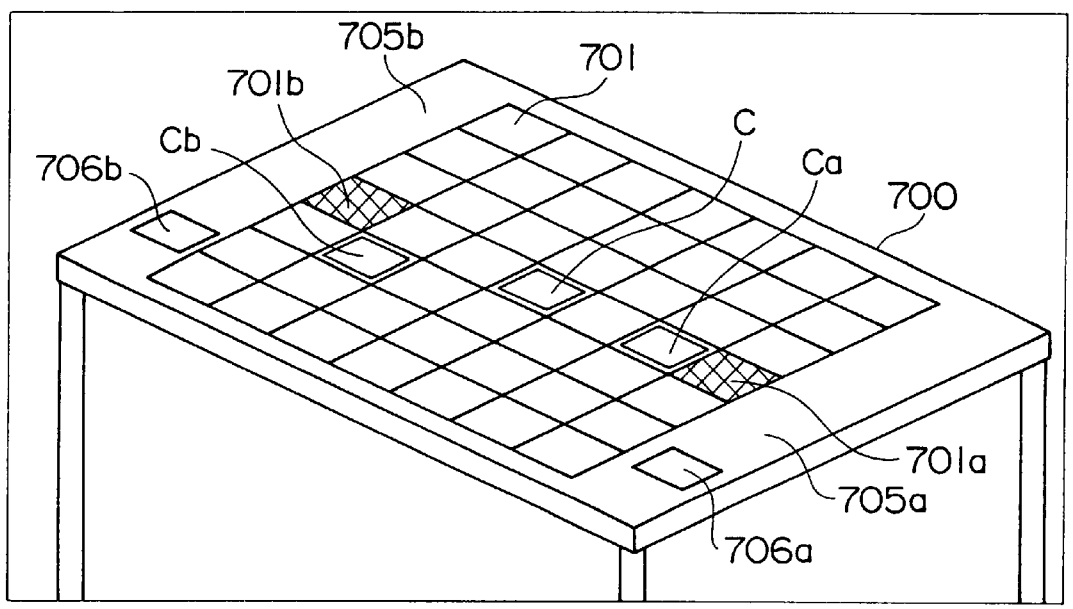
FIG. 3 shows an example of game image displayed on a monitor of a video game device according to an embodiment of the invention.

Next, description is made about an appearance of the card game with reference to FIG. 3. Herein, an example of a screen displayed on the monitor 200 and a player plays the card game to battle against a computer. Also, it is assumed that each of the player and the computer (opponent) prepares a deck including 40 cards and a deck leader which is a symbol of the player or the computer.

In FIG. 3, a board 700 including the playing field is shown which is used in the above-mentioned card game according to the invention. FIG. 3 shows an image displayed in a monitor 200. As shown in FIG. 3, the playing field is divided into 49 (7×7) part areas 701 and each of the part areas 701 has a space enough to place a card thereon. Also, in an area which is in the board 700 and is outside of the playing field, there are an area 705a which is shown in the lower part of the image and an area 705b which is shown in the upper part of the image. The areas 705a and 705b are used by a player and an opponent, respectively, as hand areas on which hand cards (including cards drawn from a deck) are placed.

On the hand areas 705a and 705b, and a hand card 706b are placed. Hand cards generally includes five cards and the cards are drawn from a deck by the player or the computer.

If five cards can not be placed on the hand area, the card game is over and the player who can not place the cards is defeated.

Deck leader cards are placed on the part areas 701a and 701b (which are cross-hatched in FIG. 3). Each of the deck leader cards only serves to symbolize the player and the computer (opponent) as described above, and has a predetermined LP (for example, 4000 points). Also, the deck leader cards are not concerned with, namely, do no have an offense ability index (AP) and a defense ability index (DP). Therefore, a card having a low AP and a low DP can be selected as the deck leader card.

Also, in FIG. 3, a deck leader card of the player is places on a part area 701a, and a deck leader card of the computer is placed on a part area 701b. When a household video game device is used to play the card game, an image of a monster corresponding to the deck leader card can be displayed on a monitor three-dimensionally.

In the first turn, the player and the computer (opponent) place cards Ca and Cb, respectively, on one of part areas next to the deck leader card. In the first turn, like the card Cb, a card can be placed on a diagonal position to the deck leader card.

In a subsequent turn, a next card C can be placed on one of eight part areas surrounding his/her own card which has been already placed on the playing field. Herein, the part areas on which the next card can be placed are referred to as "summon areas". In the card game, when all summon areas of the player are surrounded by cards of the computer (opponent), the player is defeated.

Also, in FIG. 3, although the board 700 is shown as perspective illustration, a top view of the board 700 may be displayed on the monitor.

As described above, operation of the player to draw a card from a deck to the hand area 705a is to push one of four buttons of the second operation unit 420 of the controller. Of course, another operation can be assigned to draw the card. Also, instead of pushing of the button, a card can be drawn by an operation of tilting the operation unit 450 or 460 by a predetermined angle, an operation of tilting a joystick, or an operation combining the tilting operation and the pushing operation.

In normal draw, when a button is pushed, a card is randomly selected from cards in a deck and the selected card is displayed on the hand area 705*a*. Thereafter, the player selects a card from the hand area 705*a* and put the selected card on any place in the playing field.

In the card game according to the invention, in addition to the above normal draw, critical draw is prepared which greatly effects on victory or defeat of the game in a predetermined situation. The critical draw is referred to as "destiny draw".

For example, in the case where the player is overwhelmed by a large number of monsters, or where cards of the player can not be moved due to a great number of traps, the player can perform the destiny draw and can get a excellent card to reverse the situation.

It is automatically determined by a game program whether the destiny draw is allowed or not, that is, whether a current game situation falls into the predetermined situation or not. If it is determined that the current game situation is the predetermined situation, a sign showing that the next draw is a destiny draw, is displayed on a game image.

The player recognizes by the notification that the next draw is the destiny draw rather than the normal draw. By the destiny draw, a strong card can be obtained which does not exist in a deck. For example, when the player is overwhelmed by a large number of monsters, a strong card can be provided which destroys monsters completely in response to a direct offense operation of the opponent.

However, the destiny draw does not always bring an effective card. In the card game according to the invention, a card to be provided is determined based on a speed of pushing of a draw button. Therefore, depending on the speed, a slightly effective card may be provided or an ineffective card may be provided.

Figure 4:
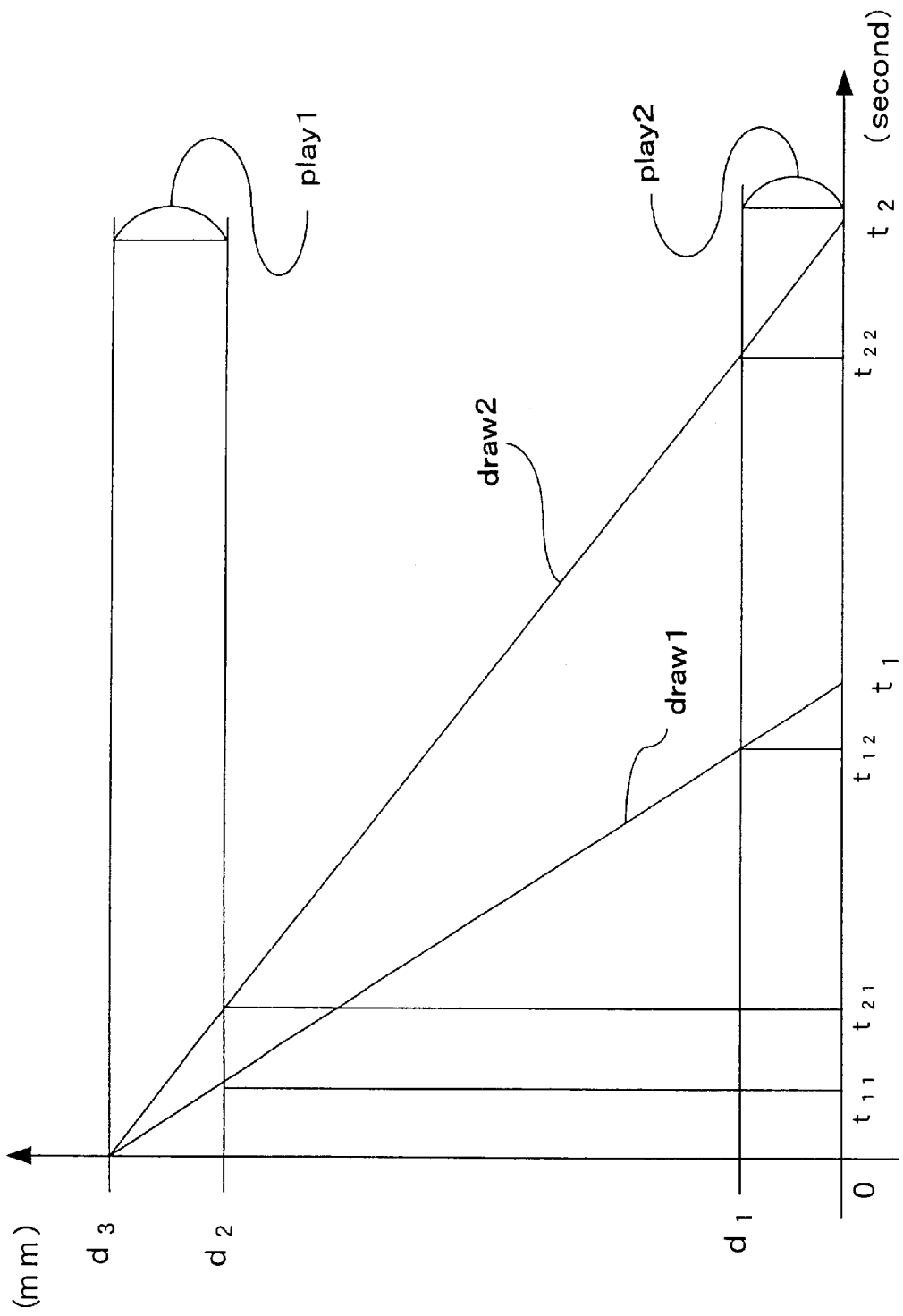
FIG. 4 schematically shows a series of displacements of a button of a game controller.

Next, description is made about an example of a method of calculating a speed of pushing the draw button with reference to FIG. 4.

FIG. 4 shows a graph representing a displacement (mm) of the button in the vertical axis and a time in the horizontal axis.

In the graph, two pushing patterns (shown by draw and draw 2) of the draw button are shown. In the pushing pattern draw 1, the button is released when t is equal to zero, and the button is pushed until t is equal to t1. On the other hand, in the pushing pattern draw 2, the button is released when t is equal to zero, and the button is pushed until t is equal to t2. It is assumed that the draw button is pushed to a physical limit position (d=0) where the button is not pushed any longer due to physical limit, when t is equal to t1 or t2.

Herein, the displacement for a time interval from a time instant when physical push of the draw button is commenced to another time instant when the CPU 111 actually detects the push is called "the play 1 (d2)". Also, displacement from when the CPU 111 can not detect any further pushing of the button to when the button is pushed to the physical limit position is called "the play 2 (d1)".

Therefore, in calculating a speed of pushing the draw button, data for displacement before the button is pushed to the d2 and after the button is pushed to the d1 are not referred to. The player is not required to push the button beyond the d1. But, as required, a length or magnitude of the play 1 and the play 2 can be enhanced.

Precision of detecting button depends on performance of a controller or CPU 111. In some video game devices, displacement of the button can be detected in 256 levels, dozens of times per a second or several hundred times per a second.

Therefore, points each of which represents displacements of the draw button in a timing can be plotted as a curve representing a transition of force to push the button. But, herein, for the sake of simple description, it is assumed that the points are plotted and produced as straight lines draw 1 and draw 2.

For the line draw 1, a speed of pushing button is determined by calculating the equation (d2−d1)/t12−t11). For the line draw 2, a speed of pushing button is determined by calculating the equation (d2−d1)/t22−t21). Therefore, the button in the draw 1 is pushed faster than the pushing of the draw 2. In this example, the simplest pattern is illustrated. But, more complex calculation can be made. For example, partial displacement of the button in a part of displacement between the d1 and the d2 is used to calculate the speed. Also, partial displacement of the button in a part of duration between t is equal to 0 and t1 is equal to 0 and t2 can be used.

In addition, a partial speed change can be detected. For example, when the button is slowly pushed in the first half, but is pushed at high speed in the second half, speed of each part can be determined.

Figure 5:
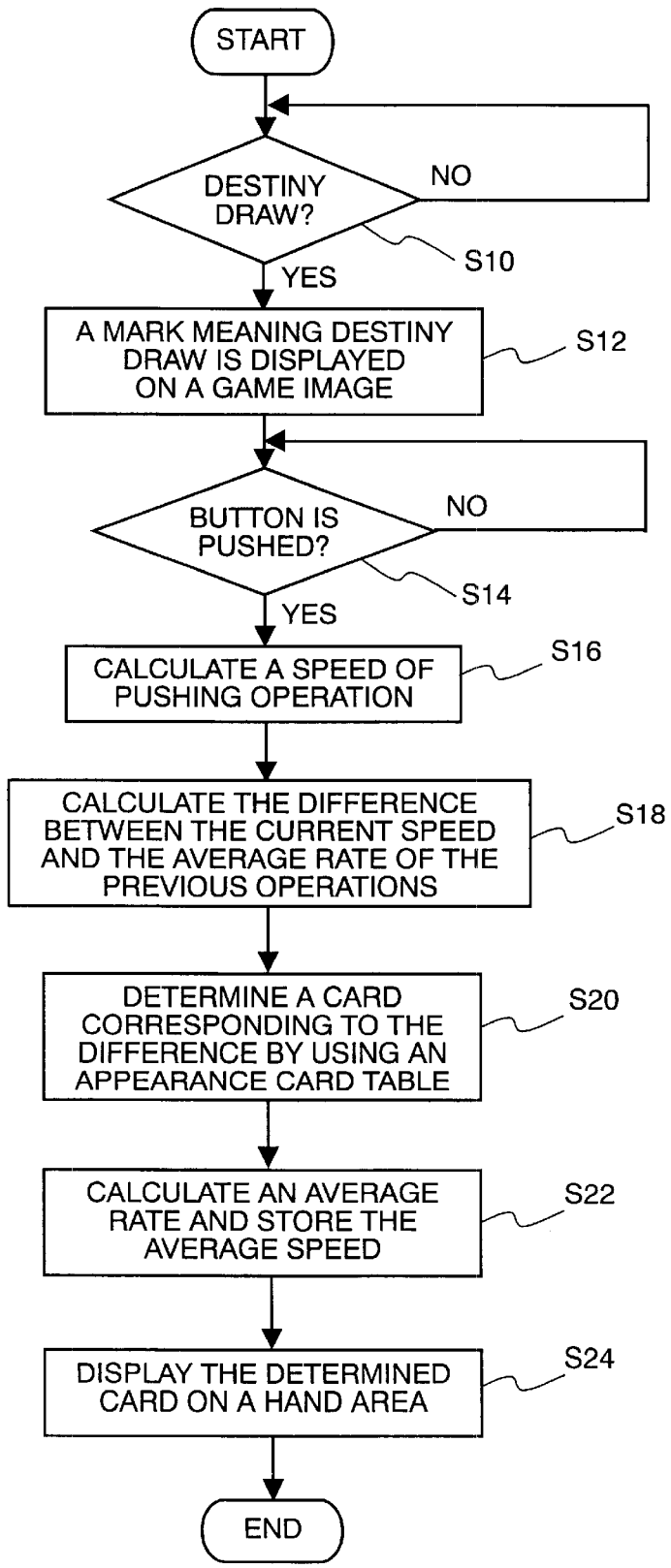
FIG. 5 shows a flowchart representing a method of controlling a manipulation of "destiny draw" according to an embodiment of the invention.

Next, description is made about a control of the game according to the invention with reference to FIG. 5.

At first, in step S10, it is determined whether the current game situation is coincident with a critical situation that is required for destiny draw or not. The current game situation includes arrangement of cards of the player and the opponent, the determination is done by referring to all the factors of the current situation and by determining whether the situation satisfies a predetermined condition or not.

When it is determined that the current situation does not fulfill requirements for the destiny draw, normal draw is performed, although description about the normal draw is omitted. Thereafter, determination of step S10 is repeated. The determination can be made in any manner as far as the determination is done in a predetermined interval or for each turn.

When it is determined that the current situation requires the destiny draw in step S10, for example, character strings "DESTINY!!" are displayed on a monitor in step S12, to emphasize that the next draw operation is the destiny draw.

Next, in step S14, it is determined whether a draw button is pushed or not. In the flowchart, for the sake of clarity, the determination is repeated until the button is pushed. But, a program can be ended when the button is not pushed, and further the program can be started again when the button is pushed.

When the button is pushed by the player, in step S16, a speed of pushing button is calculated in a manner as described about FIG. 4.

Then, in step S18, difference between an average speed of previous pushing operations and the speed calculated in step S16 is determined. The average speed is determined by averaging speeds of the previous pushing operations including normal draw operations and other button pushing operations. The speeds of the previous pushing operations are obtained, calculated, and stored at each corresponding operation. The average speed can be managed for each player.

In step S20, a card to be drawn is determined based on the situation, the difference of the speeds, and an appearance card table. Herein, configuration and contents of the appearance card table are explained with reference to FIG. 6. The appearance card table 800 defines several types of cards to be drawn as a hand card for each situation which leads to the destiny draw. A card corresponds to the situation and a range of the difference of speeds of pushing button.

In this example, if the current speed of pushing button is greater than or equal to twice the average speed, the first card is assigned, if the current speed is greater than or equal to one and a half times the average speed and the current speed is less than twice the average speed, the second card is assigned, and if the current speed is greater than or equal to the average speed and the current speed is less than one and a half times the average speed, the third card is assigned.

In the appearance card table 800, if there is no card definition in a situation and in a range of speeds is the normal draw.

Herein, description is made about operation in step S20 in the case of the situation B001 in the appearance card table 800. The situation B001 is the case where it is not able to compete because of existence of ace having a high AP.

In this case, in step S20, a ration of the current speed of pushing button to the average speed is determined and using the ration, the corresponding card is selected from the appearance card table. Therefore, if the current speed is greater than or equal to twice the average speed, a card B100 (mirror wall of a screen) is selected. The card B100 responds to a offense operation of the opponent (enemy), and reduce an AP of a monster of the opponent to a half.

If the current speed is less than twice the average speed and is greater than or equal to one and a half times the average speed, a card B200 (seal a time) is selected. The card B200 eternally spellbinds a monster having the largest AP in the playing field.

Also, if the current speed is less than one and a half the average speed and is greater than or equal to the average speed, a card B300 (a change of mind) is selected. The card B300 robs of a monster having the largest AP among monsters of the opponent.

If the current speed does not specify any conditions, that is, the current speed is less than the average speed, a card is randomly selected from a deck based on a normal operation.

In this example, the faster the button is pushed, the better the card to be provided become. Therefore, when the player pushes the draw button at high speed, an effective card is supplied. However, by adjusting contents of the appearance card table 800, an effective card can be obtained when the player pushes the draw button at a predetermined speed. In this case, the player is required to push the button at the predetermined speed rather than at possibly high speed.

Further, a speed of pushing button can be also captured as a change of speed in a part of duration or button pushing process. In this case, the player is required to be conscious of degree of pushing force from when the pushing is started to when the pushing is completed.

As described above, an operation which is performed when the player strains to draw an excellent card from a deck or prays for a good card to draw, indirectly reflects on a quality of a card to be drawn.

Also, in this embodiment, description of each situation is made and an effect of a card is noted in the appearance card table 800. But, these information is not needed. It is enough to give a relationship between a card and a speed of pushing button, for each situation.

Further, in this embodiment, cards defined in the appearance card table 800 are special cards and do not exist in a deck. This is because that excitement is given by dramatically having a narrow escape via the destiny draw. However, cards existing in the deck may be defined in the appearance card table 800.

Returning back to FIG. 5 again, in step S22, an average speed of pushing operations is determined by averaging the current pushing operation and previous pushing operations, and the new average speed is stored in a predetermined area. The calculation in the step S22 can be skipped if the current speed is far from the average speed determined from the previous operations.

This is because that there is a case where it is undesirable to calculate an average speed using a speed of pushing button at the destiny draw, which is not a normal operation, since the average speed should be calculated based on only normal operations.

Also, the calculation in step S22 can be performed in any timing when process of step S16 is completed.

Also, the calculation in step S22 can be performed in any timing when process of step S16 is completed.

The average speed is stored in a storage device such as the memory card 500, for each player.

In step S24, a card determined in step S20 is displayed on the hand area 705a shown in FIG. 3. As described above, thus displayed card is effective to overcome the difficult situation, but it is entrusted to a judgement of the player whether the card is actually placed (used) on the playing field or not.

Description about the flowchart shown in FIG. 5 has been made, but the flowchart is simplified and conceptually illustrated for the sake of easy understanding of whole process. Therefore, a person skilled in the art can think of other flowcharts to perform the method of the invention. For example, although the process of step S14 is repeated until the button is pushed in FIG. 5, it may be also designed to issue a new event for each pushing of the button and to perform processes of steps S16–S24 in the event.

Also, in the specification, description is made about a card game as an example of application of the invention. But, the method of the invention can be applied to other game such as a game using a dice, a roulette, or a slot machine. Therefore, in such the game other than the above card game, a player can experience a sense of straining or praying for a good result.

According to the invention, for example, in a dice game, it is capable of controlling so that a random number which is used to determine a spot of the dice is changed based on a speed of a inputting operation.

As described above, according to a game control method and a video game device of the invention, a card which is drawn from a deck varies based on a speed of an operation such as pushing operation of a button.

Also, according to the invention, a card to be drawn is determined based on a difference between a speed of a pushing operation of a button and an average speed of previous button pushing operations.

Furthermore, according to the invention, a card to be drawn is determined based on a relationship between a speed of a button pushing operation and a predetermined speed.

Still further, according to the invention, it is controlled that the provided new card is a card which does not exist in a deck.

What is claimed is:

1. A method of controlling a game, in a computer, by using a plurality of sorts of elements, comprising the steps of:

detecting a player's inputting operation;

determining the sort of element in response to the player's operation; and displaying the determined sort of element on a monitor;

wherein when a situation of the game becomes a predetermined situation, the determining step determines the sort of element based on the difference between a speed of the player's operation and a predetermined speed.

2. The method of claim 1, wherein the sort of element determined by the determining step is different from an element to be originally selected when the situation of the game becomes the predetermined situation.

3. The method of claim 1, wherein the greater the difference between the speeds become, the greater effect on a situation of the game the determined sort of element has.

4. The method of claim 1, wherein candidate elements used to determine the sort of element in the determining step vary according to the situation of the game.

5. The method of claim 1, wherein the predetermined speed is an average speed of the player's operations performed before the most recent player's input operation.

6. The method of claim 1, wherein the predetermined speed is a speed which is established in advance.

7. The method of claim 1, wherein the game is one of a card game, a dice game, a roulette game, and a game using a slot machine.

8. The method of claim 7, wherein the game is the card game and the plurality of sorts of elements corresponds to cards, and the displaying step displays the cards on the monitor as being drawn from a deck in the card game.

9. The method of claim 8, wherein the determining step determines the different card according to the difference between the speeds.

10. A video game device performing a game using a plurality of sorts of elements, comprising:

a detecting unit which detects a player's inputting operation;

a storage device which stores a predetermined speed;

a determining unit which detects the sort of element in response to the player's operation; and a displaying unit which displays the determined sort of element on a monitor, wherein when a situation of the game becomes a predetermined situation, the determining unit determines the sort of element based on the difference between a speed of the player's operation and the predetermined speed.

11. The video game device of claim 10 further comprising an appearance card table defining, for each situation, sorts of elements each of which is related to a range of the difference, wherein the determining step determines the sort of element by referring to the contents of the appearance card table.

12. A program product comprising, computer readable instructions and a recording medium bearing the computer readable instructions; the instructions being adaptable to enable a computer to perform a method of controlling a game, in a computer, using a plurality of sorts of elements, the method comprising the steps of:

detecting a player's inputting operation;

determining the sort of element in response to the player's operation; and displaying the determined sort of element on a monitor, wherein when a situation of the game becomes a predetermined situation, the determining step determines the sort of element on the difference between a speed of the player's operation and a predetermined speed.

* * * * *